United States Patent
von Locquenghien et al.

(10) Patent No.: US 6,187,074 B1
(45) Date of Patent: *Feb. 13, 2001

(54) COATED FERTILIZER GRANULES

(75) Inventors: Klaus Horchler von Locquenghien, Limburgerhof; Karl Engelhardt, Sauerlach; Eberhard Kleinbach, Ludwigshafen; Michael Wolfgang Müller, Biblis, all of (DE)

(73) Assignee: K + S Aktiengesellschaft, Kassel (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/973,463
(22) PCT Filed: Jun. 3, 1996
(86) PCT No.: PCT/EP96/02390
§ 371 Date: Dec. 15, 1997
§ 102(e) Date: Dec. 15, 1997
(87) PCT Pub. No.: WO96/41779
PCT Pub. Date: Dec. 27, 1994

(30) Foreign Application Priority Data

Jun. 13, 1995 (DE) .............................. 195 21 502

(51) Int. Cl.$^7$ .................................. C05G 5/00
(52) U.S. Cl. ......................... 71/64.07; 71/64.11
(58) Field of Search .............. 71/64.07, 64.11; 524/556; 525/329.5, 329.7

(56) References Cited

U.S. PATENT DOCUMENTS

| | | | |
|---|---|---|---|
| 3,177,269 | * 4/1965 | Nowak et al. | 260/878 |
| 3,520,861 | * 7/1970 | Thomson et al. | 260/88.1 |
| 3,886,125 | * 5/1975 | Chromecek | 260/78.3 UA |
| 4,248,990 | * 2/1981 | Pieski et al. | 526/317 |
| 4,252,924 | * 2/1981 | Chatterjee | 526/65 |
| 4,599,392 | * 7/1986 | McKinney et al. | 526/318.6 |
| 4,851,027 | 7/1989 | Murayama et al. | |
| 5,188,654 | * 2/1993 | Manalastas et al. | 71/28 |
| 5,206,279 | * 4/1993 | Rowland et al. | 524/379 |
| 5,466,274 | * 11/1995 | Hudson et al. | 71/28 |
| 5,746,812 | * 5/1998 | Müller et al. | 106/10 |
| 5,880,233 | * 3/1999 | Deckers et al. | 526/228 |

FOREIGN PATENT DOCUMENTS

| | | |
|---|---|---|
| 43 43 176 | 12/1993 | (DE) . |
| 337 298 | 7/1903 | (EP) . |
| 0224990 | 6/1987 | (EP) . |
| 337 298 | 10/1989 | (EP) . |
| 7-048194 | 2/1995 | (JP) . |
| WO 92/14690 | 9/1992 | (WO) . |

OTHER PUBLICATIONS

A. Shaviv & R.L. Mikkelsen (1993). Controlled–release fertilizers to increase efficiency of nutrient use and minimize environmental degradation—A review. Fertilizer Research vol. 35, pp. 1–12.

W. Gerhartz, Y. Yamamoto, et al (1987). Ullmann's Encyclopedia of Industrial Chemistry, 5$^{th}$ Edition vol. A10, pp. 363–369.

Database WPI, Section Ch, Week 9517, Derwent Publication Ltd. London GB; Class A17, AN 95–126054, XP002013280.

* cited by examiner

Primary Examiner—Wayne Langel
(74) Attorney, Agent, or Firm—Oblon, Spivak, McClelland, Maier & Neustadt, P.C.

(57) ABSTRACT

The coated fertilizer granules are coated with a carboxyl-carrying ethylene copolymer in which the carboxyl groups may also be in the form of their salts, the carboxyl-carrying ethylene copolymer being composed of a) from 75 to 90% by weight of ethylene and b) from 10 to 25% by weight of an α-olefinically unsaturated $C_3$–$C_8$-alkanecarboxylic acid, and those coated fertilizer granules which contain an active ingredient for crop protection being excepted.

6 Claims, No Drawings

COATED FERTILIZER GRANULES

BACKGROUND OF THE INVENTION

1. Field of the Invention

The present invention relates to novel coated fertilizer granules which are coated with a carboxyl-carrying ethylene copolymer in which the carboxyl groups may also be in the form of their alkali metal, alkaline earth metal or ammonium salts, the carboxyl-carrying ethylene copolymer being composed of a) from 75 to 90% by weight of ethylene and b) from 10 to 25% by weight of an $\alpha$-olefinically unsaturated $C_3$–$C_8$-alkanecarboxylic acid, and those coated fertilizer granules which contain an active ingredient for crop protection being excepted. The present invention furthermore relates to a process for their preparation and to fertilizer application methods in which the novel coated fertilizer granules are used.

2. Description of the Background

It is generally known that fertilizer granules which are coated with a water-impermeable layer of a polymer can be used as fertilizer. As a result of the coating, the efficiency of these fertilizers is increased because the coated fertilizer releases in a sustained manner the substances serving as plant nutrients and can thus display its action over a long period. Such slow-release fertilizers are described, for example, in Ullmann's Encyclopedia of Industrial Chemistry, 5th edition 1987, volume A 10, pages 363 to 369, and their advantages are summarized in Fert. Res. 35 (1993), 1–12.

U.S. Pat. No. 4,851,027 discloses the use of aqueous dispersions which contain a polymer having a glass transition temperature of 60° C. or more for coating fertilizer granules. A large number of monomers, including ethylene and unsaturated carboxylic acids, such as acrylic acid and methacrylic acid, are specified as monomers which are suitable for the preparation of these polymers.

No specific information about the use of copolymers of ethylene and olefinically unsaturated carboxylic acids as coating polymers is given. EP-A-337 298 recommends the use of copolymers of ethylene, vinyl chloride and at least one monomer selected from the group consisting of acrylamide, methacrylamide, N-methylolacrylamide, N-butoxymethacrylamides, acrylic acid, glycidyl methacrylate and hydroxyethyl acrylate as coating polymers for coating fertilizer granules.

Japanese Preliminary Published Application 71 698/87 discloses coated fertilizer granules which are prepared by applying a solution or a dispersion of an ethylene/acrylic acid copolymer in which the solvent or the continuous phase is an organic solvent, for example a hydrocarbon.

The coated fertilizer granules have to meet a variety of requirements with regard to simple and economical preparation and their performance characteristics.

The polymers should be capable of being applied to the fertilizer granules without the use of organic solvents. Furthermore, the amount of polymer required for coating the granules should be very small in order to achieve an adequate slow-release effect.

In addition, the coated fertilizer granules should show no tendency to stick together, in particular at temperatures as usually occur during their storage or during transport, without special measures being necessary in this respect. On the other hand, the coating polymers must not be excessively hard and brittle, since the coats would otherwise be damaged or even flake off when the coated fertilizer granules are subjected to mechanical stress as occurs, for example, during transfer or broadcasting on the arable land.

Coated fertilizer granules which meet these complex requirements have not been disclosed to date. Only the non-prior-published German Patent Applications with the file reference P 43 43 176.2 describe coated fertilizer granules which contain a crop protection agent and whose coat consists of a polymer which is composed of from 75 to 90% by weight of ethylene and from 10 to 35 25% by weight of an $\alpha$-olefinically unsaturated mono- or dicarboxylic acid.

SUMMARY OF THE INVENTION

It is an object of the present invention to provide coated fertilizer granules which meet the abovementioned requirements.

We have found that this object is achieved by the coated fertilizers defined at the outset. We have also found a process for their preparation and fertilizer application methods in which these coated fertilizers are used.

DETAILED DESCRIPTION OF THE INVENTION

Starting fertilizer granules which are suitable for coating are generally known granules of organic or mineral fertilizers, as described, for example, in Ullmann's Encyclopedia of Industrial Chemistry, 5th edition 1987, volume A 10, pages 323 to 431 (cf. in particular sections 2.1 and 4).

For example, single-nutrient and multinutrient fertilizers which contain nutrients such as nitrogen, potassium or phosphorus in the form of their salts, individually or, if required, in combination, are suitable. Examples of these are NP, NK, PK and NPK fertilizers, such as calcium ammonium nitrate, ammonium sulfate, ammonium nitrate sulfate and urea.

It is also possible to use starting fertilizer granules which contain salts of Mg, Fe, Mn, Cu, Zu, Mo and/or B in minor amounts, ie. usually in amounts of from 0.5 to 5% by weight, in addition to the stated main components.

The longest average diameter of the starting fertilizer granules is in general from 0.5 to 10, preferably from 0.7 to 5, mm. Their bulk density is usually from 0.5 to 1.3 kg/l. The coating consists of a carboxyl-carrying ethylene copolymer in which some or all of the carboxyl groups may also be in the form of their salts, preferably the zinc, alkali metal, alkaline earth metal or ammonium salts, the sodium or ammonium salts being particularly preferred.

Particularly suitable ammonium salts are those which are derived from ammonia, a mona-, di- or trialkanolamine, each having 2 to 18, preferably 2 to 6 carbon atoms in the hydroxyalkyl radical, or mixtures of the stated alkanolamines, or a dialkylmonoalkanolamine having 2 to 8 carbon atoms in the alkyl radical and 2 to 8 carbon atoms in the hydroxyalkyl radical, or mixtures thereof. Examples of these are diethanolamine, triethanolamine, 2-amino-2-methylpropan-1-ol and dimethylethanolamine.

Preferably from 40 to 100, particularly preferably from 70 to 90, % of the carboxyl groups are in the form of their salts.

The carboxyl-carrying ethylene copolymer is composed of a) from 70 to 90, preferably from 75 to 85, % by weight of ethylene and b) from 10 to 30, preferably from 15 to 25, % by weight of an $\alpha$-olefinically unsaturated $C_3$–$C_8$-alkanecarboxylic acid.

Particularly suitable monomers (b) are acrylic acid, methacrylic acid, crotonic acid, maleic acid, fumaric acid and itaconic acid and mixtures of these acids.

The carboxyl-carrying ethylene copolymers preferably have a melt flow index (MFI) of from 1 to 25, particularly preferably from 8 to 15 (measured at 160° C. and 325 kp).

The MFI indicates the amount of polymer melt, in grams, which can be forced, at a certain temperature and in a certain time, through a nozzle of certain dimensions when a certain force (load) is applied. The melt flow indices (MFI units) are determined similarly to the standards ASTM D 1238-65 T, ISO R 1133-1696 (E) or DIN 53 735 (1970), which are identical to one another.

The carboxyl-carrying ethylene copolymers preferably have a melting range whose final melting point ($T_{FM}$) is above 80° C., preferably above 110° C. The $T_{FM}$ is in general not higher than 200° C. The $T_{FM}$ can be determined, for example, by the differential scanning calorimetry (DSC) method, the procedure of DIN 53765 usually being employed.

The carboxyl-carrying ethylene copolymers furthermore preferably have a glass transition temperature ($T_G$) of less than 50° C., preferably from −20 to +20° C., and no glass transition temperature above 50° C. The $T_G$ is likewise usually determined by the DSC method according to DIN 53765.

The proportion of carboxyl-carrying ethylene copolymer in the total amount of the coated fertilizer granules is in general from 0.5 to 15, preferably from 2 to 10, % by weight.

The novel coated fertilizer granules are generally prepared by applying an aqueous solution or an aqueous dispersion of the carboxyl-carrying ethylene copolymer to starting fertilizer granules.

Examples of suitable aqueous dispersions are the aqueous dispersions of ethylene copolymer waxes, which dispersions are described in DE-A-34 20 168, which is hereby fully incorporated by reference.

The aqueous dispersions preferably contain from 5 to 45, preferably from 10 to 30, % by weight of the carboxyl-carrying ethylene copolymers in dispersed form.

Substances which control the release of the fertilizers may furthermore be added to the solutions or dispersions. These are in particular substances such as lignin, starch and celluloses. The amount thereof is, for example, from 0.1 to 5, preferably from 0.1 to 3, % by weight, based on the coating substance.

The solutions or dispersions of the carboxyl-carrying ethylene copolymers are advantageously applied by spraying on at in general from 10 to 110° C.

In order to avoid superficial dissolution of the starting fertilizer granules when an aqueous dispersion or solution is applied, only a limited amount of the solution or dispersion is applied per unit time, and it is ensured that the water can evaporate rapidly.

In an advantageous procedure, a fluidized bed which is produced by fluidizing the starting fertilizer granules by means of a fluidizing gas is sprayed with the solutions or dispersions at from 10 to 110° C., preferably from 30 to 70° C. After the solutions or dispersions have been sprayed on, the fluidized bed is generally maintained until the solvent or the dispersing medium has evaporated.

Such fluidized-bed application methods are generally known and have been described for the preparation of coated fertilizer granules in U.S. Pat. No. 5 211 985. These processes permit the production of particularly uniform and thin coats.

In order additionally to reduce the tendency of the coated fertilizer granules to stick together and cake, it may be advantageous to apply powdered solids, such as talc, $SiO_2$, $Al_2O_3$ or $TiO_2$, after the coating of the granules with the carboxyl-carrying ethylene copolymers.

The coated fertilizer granules contain no effective amounts of active ingredients for crop protection, for example fungicidal active ingredients.

The coated fertilizer granules, if required together with nitrification inhibitors or growth regulators, are applied by conventional methods to the arable land, where they release the fertilizer over a relatively long period in a form available to plants. The fertilizer granules are distinguished in particular by the fact that they show comparatively little tendency to stick together and cake, even at elevated temperatures, and their coat are insensitive to mechanical stresses as typically encountered during transfer and transport.

EXAMPLES

Preparation of the Coated Fertilizer Granules

In a commercial fluidized-bed coater (eg. Multiprozessor MP 1 from Aeromatic, 4416 Bubendorf, Switzerland; Kugelcoater HKC-5 from Huttlin, 79585 Steinen, Germany), the fertilizer granules were fluidized by means of preheated air and heated to the desired temperature. The particular aqueous polymer dispersions were sprayed by means of nozzles present in the apparatuses, and the granules were thus coated with a polymer film. The spray rate was chosen so that superficial dissolution of the fertilizer was avoided. After the end of spraying, the product was dried for a few minutes in the fluidized bed. By varying the amount of coating material, it was possible to adjust the release rate of the nutrients and hence the desired duration of action of the fertilizer (cf. Example 12).

The composition of the fertilizer granules used is indicated by the combinations of numbers stated in parentheses in the Examples:

1st number Nitrogen, the corresponding amount by weight of $N_2$ is stated

2nd number Phosphorus, the corresponding amount by weight of $P_2O_5$ is stated

3rd number Potassium, the corresponding amount by weight of $K_2O$ is stated

4th number Magnesium, the corresponding amount by weight of MgO is stated

The fertilizer Nitrophoska® Perfekt (15+5+20+2) thus contains nitrogen, phosphorus, potassium and magnesium in the same ratio as a fertilizer mixture comprising 15 parts of N, 5 parts of $P_2O_5$, 20 parts of $K_2O$ and 2 parts of MgO.

Investigation of the Slow-release Effect 10 g of the particular coated fertilizer granules were continuously extracted with water. For this purpose, the granules were arranged in a layer in a cylindrical glass vessel filled with water, so that the granules were completely surrounded by water. Water was passed at a flow velocity of 1 ml/min through this layer of granules, and the water passed through this layer was removed from the vessel and its nitrogen content analyzed. The total amount of fertilizer which had been extracted from the granules after a certain period was calculated from the amount of water removed and its nitrogen content. This amount was stated in each case as the N leaching rate.

Example 1

| Fertilizer granules | type | Nitrophoska ® Perfekt (15 + 5 + 20 + 2) produced by BASF |
|---|---|---|
| | amount | 3860 g |
| Polymer dispersion | type | wax dispersion Poligen ® WE3 containing 25% by weight of an ethylene/acrylic acid copolymer of 20% by weight acrylic acid and 80% by weight of ethylene, 3.68% by weight of ammonia solution (25% strength by weight), 0.20% by weight of $Na_2S_2O_5$ and 71.32% by weight of water $T_G = 0°$ C. $T_{FM} = 115°$ C. |
| | amount | 560 g + 140 g of water |

-continued

| | | |
|---|---|---|
| Process temperature | | 47° C. |
| Process time | | 60 min |
| Amount of coat, based on finished product: 3.5% | | |
| N leaching rate | after 24 h: | 4.8% |
| | after 7 d: | 31.1% |

Example 2

| | | |
|---|---|---|
| Fertilizer granules | type | granulated diammonium phosphate (DAP 18 + 46) from Int. Ore and Fertilizer Belgium S.A., Brussels |
| | amount | 4700 g |
| Polymer dispersion | type | as in Example 1 |
| | amount | 1200 g + 300 g of water |
| Process temperature | | 42° C. |
| Process time | | 60 min |
| Amount of coat, based on finished product: 6% | | |
| N leaching rate | after 24 h: | 13.5% |
| | after 7 d: | 50.1% |

Example 3

| | | |
|---|---|---|
| Fertilizer granules | type | granulated urea from Agrimont, Italy |
| | amount | 2850 g |
| Polymer dispersion | type | as in Example 1 |
| | amount | 600 g |
| Process temperature | | 45° C. |
| Process time | | 55 min |
| Amount of coat, based on finished product: 5% | | |
| N leaching rate | after 24 h: | 14.0% |
| | after 7 d: | 47.8% |

Example 4

| | | |
|---|---|---|
| Fertilizer granules | type | urea-containing NPK fertilizer (16 + 10 + 19 + 2) with 35% of urea, produced at BASF |
| | amount | 3800 g |
| Polymer dispersion | type | as in Example 1 |
| | amount | 800 g |
| Process temperature | | 45° C. |
| Process time | | 82 min |
| Amount of coat, based on finished product: 5% | | |
| N leaching rate | after 24 h: | 4.6% |
| | after 3 d: | 14.5% |

Comparative Example 5

| | | |
|---|---|---|
| Fertilizer granules | type | Nitrophoska ® Perfekt (15 + 5 + 20 + 2) produced by BASF |
| | amount | 1850 g |
| Polymer dispersion | type | aqueous dispersion containing 50% by weight of a copolymer of styrene acrylonitriie and acrylic acid (Styrofan ® 120 D from BASF) |
| | amount | 300 g |

-continued

| | | |
|---|---|---|
| Process temperature | | 38° C. |
| Process time | | 53 min |
| Amount of coat, based on finished product: 15% | | |
| N leaching rate | after 24 h: | 100% (coat flakes off) |

Comparative Example 6

| | | |
|---|---|---|
| Fertilizer granules | type | Nitrophoska ® Perfekt (15 + 5 + 20 + 2) produced by BASF |
| | amount | 1850 g |
| Polymer dispersion | type | aqueous dispersion containing 40% by weight of a copolymer of 60% of methyl methacrylate, 30% of n-butyl acrylate and 10% of methacrylic acid (Acronal ® A 969 from BASF) |
| | amount | 375 g |
| Process temperature | | 38° C. |
| Process time | | 46 min |
| Amount of coat, based on finished product: 15% | | |
| N leaching rate | after 24 h: | 100% (coat flakes off) |

Comparative Example 7

| | | |
|---|---|---|
| Fertilizer granules | type | Nitrophoska Perfekt (12 + 12 + 17 + 2) produced by BASF |
| | amount | 3487 g |
| Polymer dispersion | type | aqueous dispersion containing 38% by weight of a polyethylene having a molecular weight of about 18,000 D (Poligen PE from BASF) $T_G = -80°$ C. $T_{FM} > 100°$ C. |
| | amount | 513 g |
| Process temperature | | 67° C. |
| Process time | | 25 min |
| Amount of coat, based on finished product: 5.5% | | |
| N leaching rate | after 24 h: | 100% |

Comparative Example 8

| | | |
|---|---|---|
| Fertilizer granules | type | Nitrophoska Perfekt (15 + 5 + 20 + 2) produced by BASF |
| | amount | 1850 g |
| Polymer dispersion | type | aqueous dispersion containing 45% by weight of a copolymer based on styrene and butyl acrylate (Acronal 168 D from BASF) |
| | amount | 334 g |
| Process temperature | | 40° C. |
| Process time | | 50 min |
| Amount of coat, based on finished product: 15% | | |
| N leaching rate | after 24 h: | 100% |

Comparative Example 9

| Fertilizer granules | type | Nitrophoska Perfekt (15 + 5 + 20 + 2) produced by BASF |
| --- | --- | --- |
| | amount | 4000 g |
| Polymer dispersion | type | aqueous dispersion containing 37% by weight of a copolymer based on styrene and butyl acrylate (Acronal 168 D from BASF) |
| | amount | 545 g |
| Process temperature | | 69° C. |
| Process time | | The product sticks together after a short time, experiment was terminated |

Comparative Example 10

| Fertilizer granules | type | granulated urea from Agrimont, Italy |
| --- | --- | --- |
| | amount | 2080 g |
| Polymer dispersion | type | aqueous dispersion containing 50% by weight of a copolymer of 29% of styrene and 71% of 1,3-butadiene (Butonal ® LS 104 from BASF) |
| | amount | 415 g |
| Process temperature | | 46° C. |
| Process time | | 50 min |
| Amount of coat, based on finished product: 10% | | |
| N leaching rate | after 24 h: | 100% |

Comparative Example 11

| Fertilizer granules | type | granulated urea from Agrimont, Italy |
| --- | --- | --- |
| | amount | 2550 g |
| Polymer dispersion | type | aqueous dispersion containing 45% by weight of a copolymer of 34% of 1,3-butadiene, 61% of styrene, 3.5% of acrylic acid and 1.5% of acrylamide (Styrofan ® DS 2306 from BASF) |
| | amount | 1000 g |
| Process temperature | | 45° C. |
| Process time | | 85 min |
| Amount of coat, based on finished product: 15% | | |
| N leaching rate | after 24 h: | 100% |

Example 12

A fluidized-bed apparatus having a base area of 520 cm² and a hole diameter of 2.7 mm was used in this Example. The flow rate of the fluidizing gas was 2000 m³ (S.T.P.)/h and the flow rate of the nozzle gas was 38 m³ (S.T.P.)/h. During the experiment, samples were taken as soon as the applied amount of coat was 2.5%, 3.0%, 4.0% and, finally, 5.0%.

| Fertilizer granules | type | Nitrophoska ® Perfekt (15 + 5 + 20 + 2) produced by BASF | | | |
| --- | --- | --- | --- | --- | --- |
| | amount | 46,000 g | | | |
| Polymer dispersion | type | as in Example 1 | | | |
| | amount | 9200 g of dispersion in total and 6130 g of water | | | |
| Process temperature | | 40° C. | | | |
| Process time | | 70 min | | | |
| Amount of coat, based on finished product: | | 2.5% | 3.0% | 4.0% | 5.0% |
| N leaching rate | after 24 h: | 24.0% | 14.5% | 3.0% | 1.8% |
| | after 7 d: | 68.8% | 52.3% | 31.8% | 21.0% |

The $T_G$ and $T_{FM}$ were determined by DSC according to DIN 53765.

We claim:

1. A method of fertilizing arable land, comprising applying a coated fertilizer granule to the arable land, wherein the coating comprises a carboxyl-containing ethylene copolymer comprising:
(a) from 75 to 90% by weight of polymerized ethylene units, and
(b) from 10 to 25% by weight of polymerized α-olefinically unsaturated $C_3$–$C_8$-alkanecarboxylic acid units, in which the carboxyl group may optionally be in the form of salts; and wherein said copolymer has a melt flow index of from 1 to 25 g/min;

with the proviso that the fertilizer granule does not contain an active ingredient for protection.

2. The method of claim 1, wherein (b) comprises polymerized acrylic acid units, polymerized methacrylic acid units or polymerized acrylic acid units and polymerized methacrylic acid units.

3. The method of claim 1, wherein the copolymer has a melting range whose final melting point ($T_{FM}$) is above 80° C.

4. The method of claim 1, wherein the glass transition temperature ($T_G$) of the copolymer is below 50° C.

5. The method of claim 1, wherein a longest average diameter of the coated fertilizer granule is from 0.5 to 10 mm.

6. The method of claim 1, wherein the carboxyl groups of the copolymer are in the form of a salt of a cation selected from the group consisting of alkali metal ions, alkaline earth metal ions and ammonium ions.

* * * * *

UNITED STATES PATENT AND TRADEMARK OFFICE
CERTIFICATE OF CORRECTION

PATENT NO. : 6,187,074 B1
DATED : February 13, 2001
INVENTOR(S) : Von Locquenghien et al.

It is certified that error appears in the above-identified patent and that said Letters Patent is hereby corrected as shown below:

<u>Title page,</u>
Item (87), the PCT Publication Date is listed incorrectly. Item (87) should read as follows:

-- (87) PCT Pub. No.: WO96/41779
      PCT Pub. Date: Dec. 27, 1996

Signed and Sealed this

Seventh Day of August, 2001

*Attest:*

*Attesting Officer*

NICHOLAS P. GODICI
*Acting Director of the United States Patent and Trademark Office*